US012508806B2

(12) United States Patent
Yoshida et al.

(10) Patent No.: US 12,508,806 B2
(45) Date of Patent: Dec. 30, 2025

(54) DRIVE DEVICE, DRIVE BOARD, LIQUID JET HEAD, AND LIQUID JET RECORDING DEVICE

(71) Applicant: SII Printek Inc., Chiba (JP)

(72) Inventors: Kensuke Yoshida, Chiba (JP); Toshiaki Watanabe, Chiba (JP)

(73) Assignee: SII PRINTEK INC., Chiba (JP)

( * ) Notice: Subject to any disclaimer, the term of this patent is extended or adjusted under 35 U.S.C. 154(b) by 151 days.

(21) Appl. No.: 18/386,523

(22) Filed: Nov. 2, 2023

(65) Prior Publication Data

US 2024/0173965 A1 May 30, 2024

(30) Foreign Application Priority Data

Nov. 29, 2022 (JP) ................................ 2022-190196

(51) Int. Cl.
*B41J 2/045* (2006.01)
*B41J 2/14* (2006.01)

(52) U.S. Cl.
CPC ........ *B41J 2/04541* (2013.01); *B41J 2/14201* (2013.01); *B41J 2002/14491* (2013.01)

(58) Field of Classification Search
CPC .. B41J 2/04541; B41J 2/04515; B41J 2/0452; B41J 2/04548; B41J 2002/14491; B41J 2/14201; B41J 2/175; H01L 23/482; H01L 23/50
See application file for complete search history.

(56) References Cited

U.S. PATENT DOCUMENTS

2017/0239940 A1 8/2017 Yamashita
2019/0255840 A1* 8/2019 Nitta .................. B41J 2/14201
2019/0283420 A1 9/2019 Kida

FOREIGN PATENT DOCUMENTS

JP 2014-177049 A 9/2014
JP 2017-144672 A 8/2017

OTHER PUBLICATIONS

Extended European Search Report in Europe Application No. 23212704.3, dated Apr. 11, 2024, 7 pages.

* cited by examiner

*Primary Examiner* — Leslie J Evanisko
*Assistant Examiner* — Thomas Ray Knief
(74) *Attorney, Agent, or Firm* — Crowell & Moring LLP

(57) ABSTRACT

There are provided a drive device and so on capable of improving the reliability. A drive device according to an embodiment of the present disclosure is a drive device configured to generate a drive signal to be applied to a liquid jet head having a plurality of nozzles, the drive device including a plurality of drive terminals which is arranged along a longitudinal direction of the drive device, and which is configured to individually output the drive signal for jetting liquid from the nozzles, and at least one dummy terminal configured to electrically be coupled to a predetermined constant potential. The plurality of drive terminals is divided into a plurality of drive terminal groups arranged along the longitudinal direction, and the dummy terminal is arranged at at least one of intervals between the plurality of drive terminal groups.

8 Claims, 11 Drawing Sheets

MODIFIED EXAMPLE 1-1

MODIFIED EXAMPLE 1-2

MODIFIED EXAMPLE 2

MODIFIED EXAMPLE 3

DRIVE DEVICE, DRIVE BOARD, LIQUID JET HEAD, AND LIQUID JET RECORDING DEVICE

RELATED APPLICATIONS

This application claims priority to Japanese Patent application No. JP2022-190196 filed on Nov. 29, 2022, the entire content of which is incorporated herein by reference.

BACKGROUND OF THE INVENTION

1. Field of the Invention

The present disclosure relates to a drive device, a drive board, a liquid jet head, and a liquid jet recording device.

2. Description of the Related Art

Liquid jet recording devices equipped with liquid jet heads are used in a variety of fields, and a variety of types of liquid jet heads have been developed (see, e.g., JP-A-2017-144672).

In such a liquid jet head, in general, it is required to improve the reliability.

It is desirable to provide a drive device, a drive board, a liquid jet head, and a liquid jet recording device capable of improving the reliability.

SUMMARY OF THE INVENTION

A drive device according to an embodiment of the present disclosure is a drive device configured to generate a drive signal to be applied to a liquid jet head having a plurality of nozzles, the drive device including a plurality of drive terminals which is arranged along a longitudinal direction of the drive device, and which is configured to individually output the drive signal for jetting liquid from the nozzles, and at least one dummy terminal configured to electrically be coupled to a predetermined constant potential. The plurality of drive terminals is divided into a plurality of drive terminal groups arranged along the longitudinal direction, and the dummy terminal is arranged at at least one of intervals between the plurality of drive terminal groups.

The drive board according to an embodiment of the present disclosure includes at least one of the drive board according to the embodiment of the present disclosure, wherein the drive device is mounted on a board surface in the drive device.

A liquid jet head according to an embodiment of the present disclosure includes the drive board according to the embodiment of the present disclosure, and a jet section which is configured to jet the liquid based on the drive signal output from the drive board, and which has a plurality of nozzles.

A liquid jet recording device according to an embodiment of the present disclosure includes the liquid jet head according to the embodiment of the present disclosure.

According to the drive device, the drive board, the liquid jet head, and the liquid jet recording device related to an embodiment of the present disclosure, it becomes possible to improve the reliability.

DETAILED DESCRIPTION OF THE PREFERRED EMBODIMENTS

An embodiment of the present disclosure will hereinafter be described in detail with reference to the drawings. It should be noted that the description will be presented in the following order:

1. Embodiment (an example when two drive element groups, a single type power-supply wiring line, and a single type ground wiring line are adopted)
2. Modified Examples
   - Modified Examples 1-1, 1-2 (examples when adopting two types of power-supply wiring lines in the embodiment)
   - Modified Example 2 (an example when disposing circuit components on a second constant-potential wiring lines in Modified Example 1-2)
   - Modified Example 3 (an example when adopting three drive element groups in the embodiment)
3. Other Modified Examples

1. Embodiment

[Outline Configuration of Printer 5]

Figure 1:
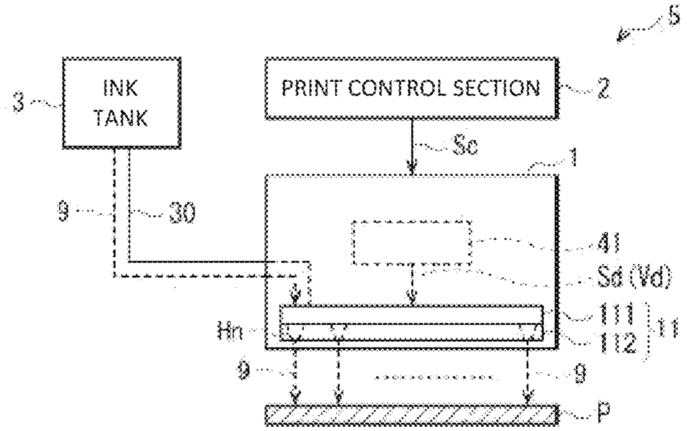
FIG. 1 is a block diagram showing an outline configuration example of a liquid jet device according to an embodiment of the present disclosure.
Figure 2:
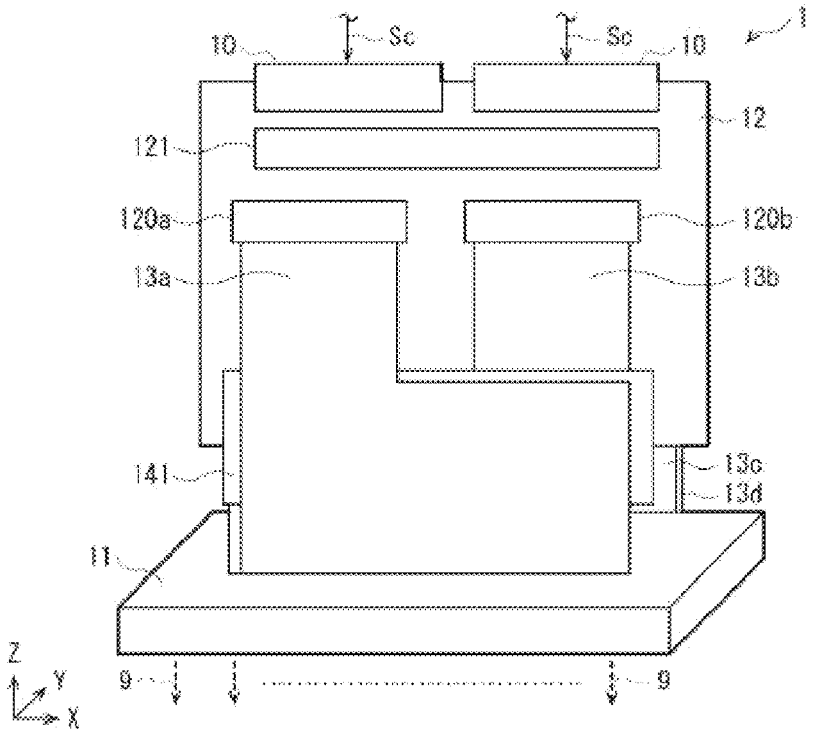
FIG. 2 is a perspective view schematically showing an outline configuration example of a liquid jet head shown in FIG. 1.
Figure 3:
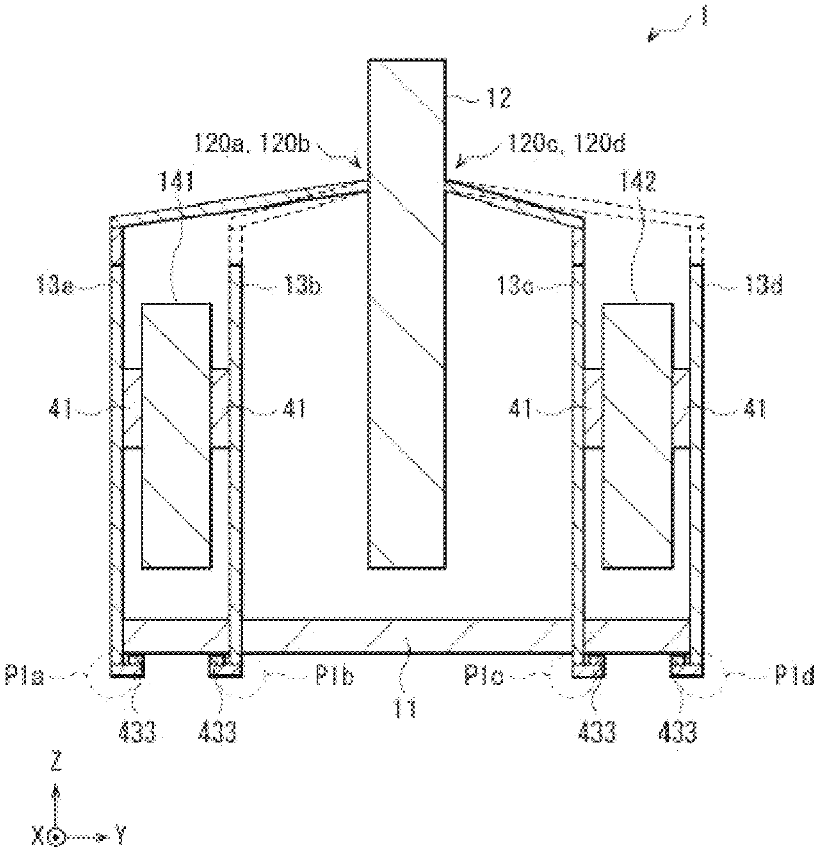
FIG. 3 is a cross-sectional view schematically showing a configuration example of the liquid jet head shown in FIG. 2.

FIG. 1 is a block diagram showing an outline configuration example of a printer 5 as a liquid jet recording device according to an embodiment of the present disclosure. FIG. 2 is a perspective view schematically showing an outline configuration example of an inkjet head 1 as a liquid jet head shown in FIG. 1. FIG. 3 is a cross-sectional view (a Y-Z cross-sectional view) schematically showing a configuration example of the inkjet head 1 shown in FIG. 2. It should be noted that a scale size of each of the members is accordingly altered so that the member is shown in a recognizable size in the drawings used in the description of the present specification.

The printer 5 is an inkjet printer for performing recording (printing) of images, characters, and the like on a recording target medium (e.g., recording paper P shown in FIG. 1) using ink 9 described later. As shown in FIG. 1, the printer 5 is provided with the inkjet head 1, a print control section 2, and an ink tank 3.

It should be noted that the inkjet head 1 corresponds to a specific example of a "liquid jet head" in the present disclosure, and the printer 5 corresponds to a specific example of a "liquid jet recording device" in the present disclosure. Further, the ink 9 corresponds to a specific example of a "liquid" in the present disclosure.

(A. Print Control Section 2)

The print control section 2 is for supplying the inkjet head 1 with a variety of types of information (data). Specifically, as shown in FIG. 1, the print control section 2 is arranged to supply each of constituents (drive devices 41 described later and so on) in the inkjet head 1 with a print control signal Sc. It should be noted that the print control signal Sc is arranged to include, for example, image data, an ejection timing signal, and a power-supply voltage for making the inkjet head 1 operate.

(B. Ink Tank 3)

The ink tank 3 is a tank for containing the ink 9 inside. As shown in FIG. 1, the ink 9 in the ink tank 3 is arranged to be supplied to the inside (a jet section 11 described later) of the inkjet head 1 via an ink supply tube 30. It should be noted that such an ink supply tube 30 is formed of, for example, a flexible hose having flexibility.

(C. Inkjet Head 1)

The inkjet head 1 is a head for jetting (ejecting) the ink 9 shaped like a droplet from a plurality of nozzle holes Hn described later to the recording paper P as represented by dotted arrows in FIG. 1 to thereby perform recording of images, characters, and so on. As shown in, for example, FIG. 2 and FIG. 3, the inkjet head 1 is provided with a single jet section 11, a single I/F (interface) board 12, four flexible boards 13*a*, 13*b*, 13*c*, and 13*d*, and two cooling units 141, 142.

(C-1. I/F Board 12)

As shown in FIG. 2 and FIG. 3, the I/F board 12 is provided with two connectors 10, four connectors 120*a*, 120*b*, 120*c*, and 120*d*, and a circuit arrangement area 121.

As shown in FIG. 2, the connectors 10 are each a part (a connector part) for inputting the print control signal Sc which is described above, and which is supplied from the print control section 2 toward the inkjet head 1 (the flexible boards 13*a*, 13*b*, 13*c*, and 13*d* described later). The connectors 120*a*, 120*b*, 120*c*, and 120*d* are parts (connector parts) for electrically coupling the I/F board 12 and the flexible boards 13*a*, 13*b*, 13*c*, and 13*d*, respectively.

The circuit arrangement area 121 is an area where a variety of circuits are arranged on the I/F board 12. It should be noted that it is also possible to arrange that such a circuit arrangement area is also disposed in other areas on the I/F board 12.

(C-2. Jet Section 11)

As shown in FIG. 1, the jet section 11 is a part which has the plurality of nozzle holes Hn, and which jets the ink 9 from these nozzle holes Hn. Such jet of the ink 9 is arranged to be performed in accordance with drive signals Sd (drive voltages Vd) supplied from the drive devices 41 described later on each of the flexible boards 13*a*, 13*b*, 13*c*, and 13*d* (see FIG. 1).

As shown in FIG. 1, such a jet section 11 is configured including an actuator plate 111 and a nozzle plate 112.

(Nozzle Plate 112)

The nozzle plate 112 is a plate formed of a film material such as polyimide, or a metal material, and has the plurality of nozzle holes Hn described above as shown in FIG. 1. These nozzle holes Hn are formed side by side at predetermined intervals, and each have, for example, a circular shape.

Specifically, in the example of the jet section 11 shown in FIG. 2, the plurality of nozzle holes Hn in the nozzle plate 112 is constituted by a plurality of nozzle arrays (four nozzle arrays) each arranged along a column direction (an X-axis direction). Further, these four nozzle arrays are arranged side by side along a direction (a Y-axis direction) perpendicular to the column direction.

It should be noted that such a nozzle hole Hn corresponds to a specific example of a "nozzle" in the present disclosure.

(Actuator Plate 111)

The actuator plate 111 is a plate formed of a piezoelectric material such as PZT (lead zirconate titanate). The actuator plate 111 is provided with a plurality of channels (pressure chambers). These channels are each a part for applying pressure to the ink 9, and are arranged side by side so as to be parallel to each other at predetermined intervals. Each of the channels is partitioned with drive walls (not shown) formed of a piezoelectric body, and forms a groove part having a recessed shape in a cross-sectional view.

As such channels, there exist ejection channels for ejecting the ink 9, and dummy channels (non-ejection channels) which do not eject the ink 9. In other words, it is arranged that the ejection channels are filled with the ink 9 on the one hand, but the dummy channels are not filled with the ink 9 on the other hand. It should be noted that it is arranged that filling of each of the ejection channels with the ink 9 is performed via, for example, a flow channel (a common flow channel) commonly communicated with such ejection channels. Further, it is arranged that each of the ejection channels is individually communicated with the nozzle hole Hn in the nozzle plate 112 on the one hand, but each of the dummy channels is not communicated with the nozzle hole Hn on the other hand. These ejection channels and the dummy channels are alternately arranged side by side along the column direction (the X-axis direction) described above.

Further, on the inner side surfaces opposed to each other in the drive walls described above, there are respectively disposed drive electrodes. As the drive electrodes, there exist common electrodes disposed on the inner side surfaces facing the ejection channels, and active electrodes (individual electrodes) disposed on the inner side surfaces facing the dummy channels. These drive electrodes and the drive devices 41 described later are electrically coupled to each other via each of the flexible boards 13*a*, 13*b*, 13*c*, and 13*d*. Thus, it is arranged that the drive voltages Vd (the drive signals Sd) described above are applied to the drive electrodes from the drive devices 41 via each of the flexible boards 13*a*, 13*b*, 13*c*, and 13*d* (see FIG. 1).

(C-3. Flexible Boards 13*a*, 13*b*, 13*c*, and 13*d*)

The flexible boards 13*a*, 13*b*, 13*c*, and 13*d* are each a board for electrically coupling the I/F board 12 and the jet section 11 to each other as shown in FIG. 2 and FIG. 3. These flexible boards 13*a*, 13*b*, 13*c*, and 13*d* are arranged to individually control the jet actions of the ink 9 in the four nozzle arrays in the nozzle plate 112 described above, respectively. Further, as indicated by the reference symbols P1*a*, P1*b*, P1*c*, and P1*d* in, for example, FIG. 3, it is arranged that the flexible boards 13*a*, 13*b*, 13*c*, and 13*d* are folded around places (around clamping electrodes 433) where the flexible boards 13*a*, 13*b*, 13*c*, and 13*d* are coupled to the jet section 11, respectively. It should be noted that it is arranged that electrical coupling between the clamping electrodes 433 and the jet section 11 is achieved by, for example, thermo-compression bonding using an ACF (Anisotropic Conductive Film).

On each of such flexible boards 13*a*, 13*b*, 13*c*, and 13*d*, there are individually mounted the drive devices 41 (see FIG. 3). These drive devices 41 are each a device for outputting the drive signals Sd (the drive voltages Vd) for jetting the ink 9 from the nozzle holes Hn in the corresponding nozzle array in the jet section 11. Therefore, it is arranged that such drive signals Sd are output from each of the flexible boards 13*a*, 13*b*, 13*c*, and 13*d* to the jet section 11. It should be noted that such drive devices 41 are each formed of, for example, an ASIC (Application Specific Integrated Circuit).

Further, these drive devices 41 are arranged to be cooled by the cooling units 141, 142 described above. Specifically, as shown in FIG. 3, the cooling unit 141 is fixedly arranged between the drive devices 41 on the flexible boards 13*a*, 13*b*, and by pressing the cooling unit 141 against each of these drive devices 41, the drive devices 41 are cooled. Similarly, the cooling unit 142 is fixedly arranged between the drive devices 41 on the flexible boards 13*c*, 13*d*, and by pressing the cooling unit 142 against each of these drive devices 41, the drive devices 41 are cooled. It should be noted that such cooling units 141, 142 can each be configured using a variety of types of cooling mechanisms.

[Detailed Configuration of Flexible Boards 13*a*, 13*b*, 13*c*, and 13*d*]

Subsequently, a detailed configuration example of the flexible boards 13*a*, 13*b*, 13*c*, and 13*d* described above will be described with reference to FIG. 4A, FIG. 4B, and FIG. 5 through FIG. 8 in addition to FIG. 1 through FIG. 3.

Figure 4A:
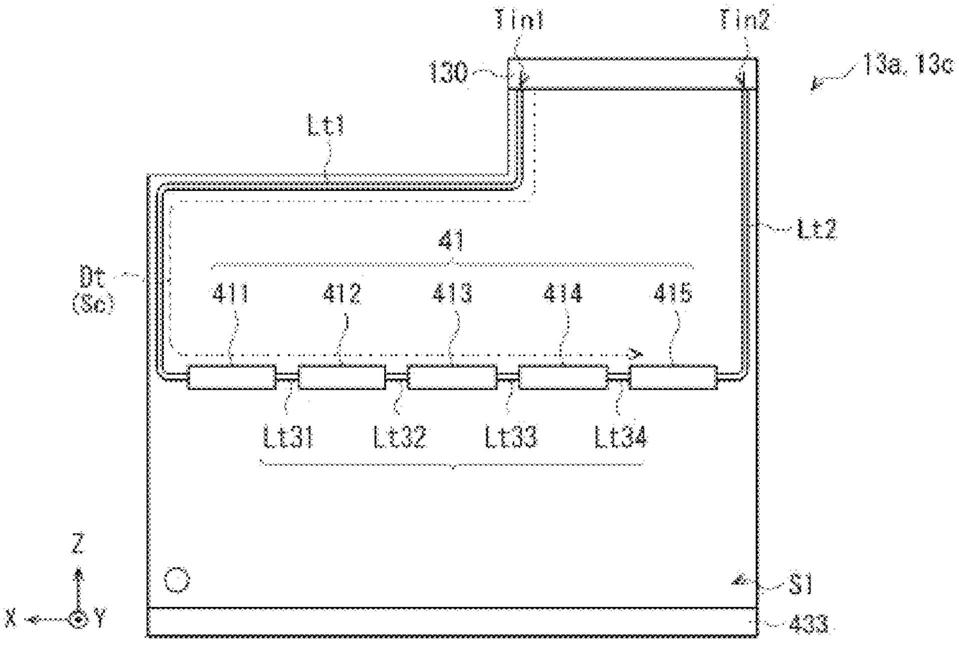
FIG. 4A is a plan view schematically showing a detailed configuration example of flexible boards shown in FIG. 2 and FIG. 3.
Figure 4B:
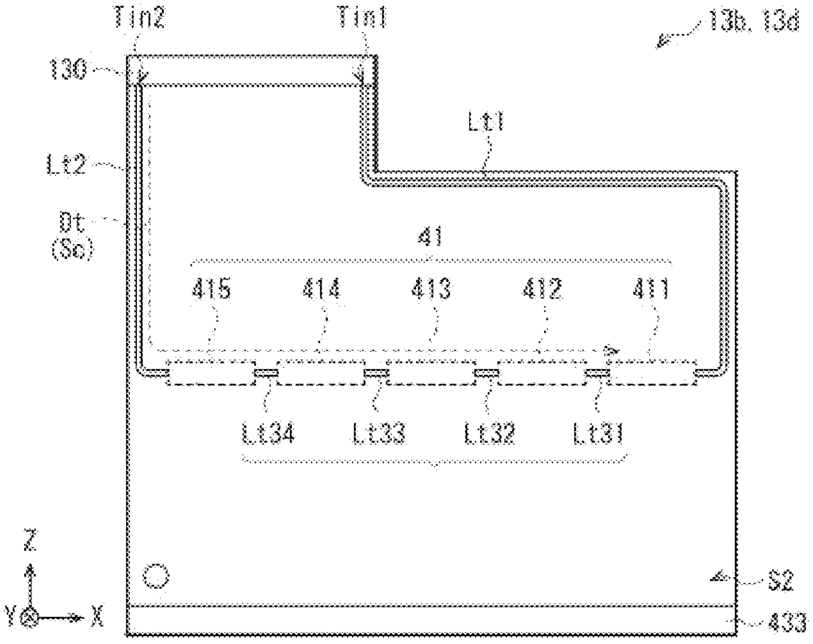
FIG. 4B is a plan view schematically showing a detailed configuration example of other flexible boards shown in FIG. 2 and FIG. 3.
Figure 5:
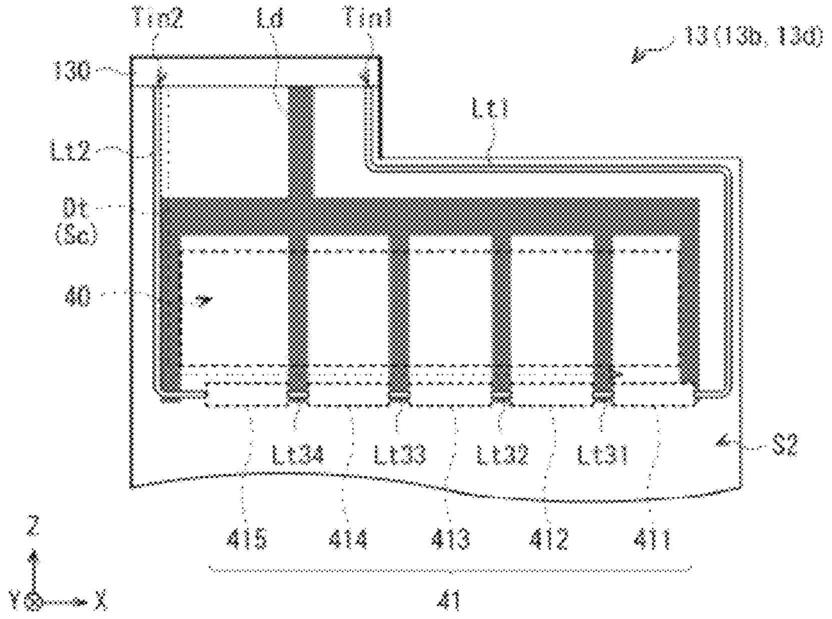
FIG. 5 is a plan view schematically showing an arrangement configuration example of wiring lines and so on in the flexible boards shown in FIG. 4B.
Figure 6:
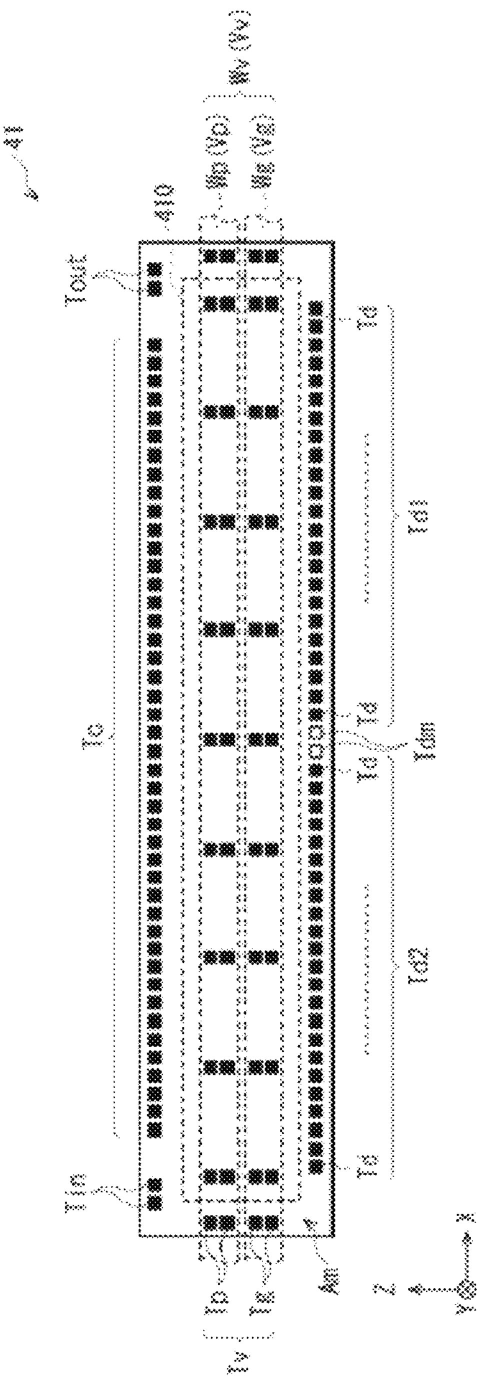
FIG. 6 is a plan view schematically showing a detailed configuration example of a drive device according to the embodiment.
Figure 7:
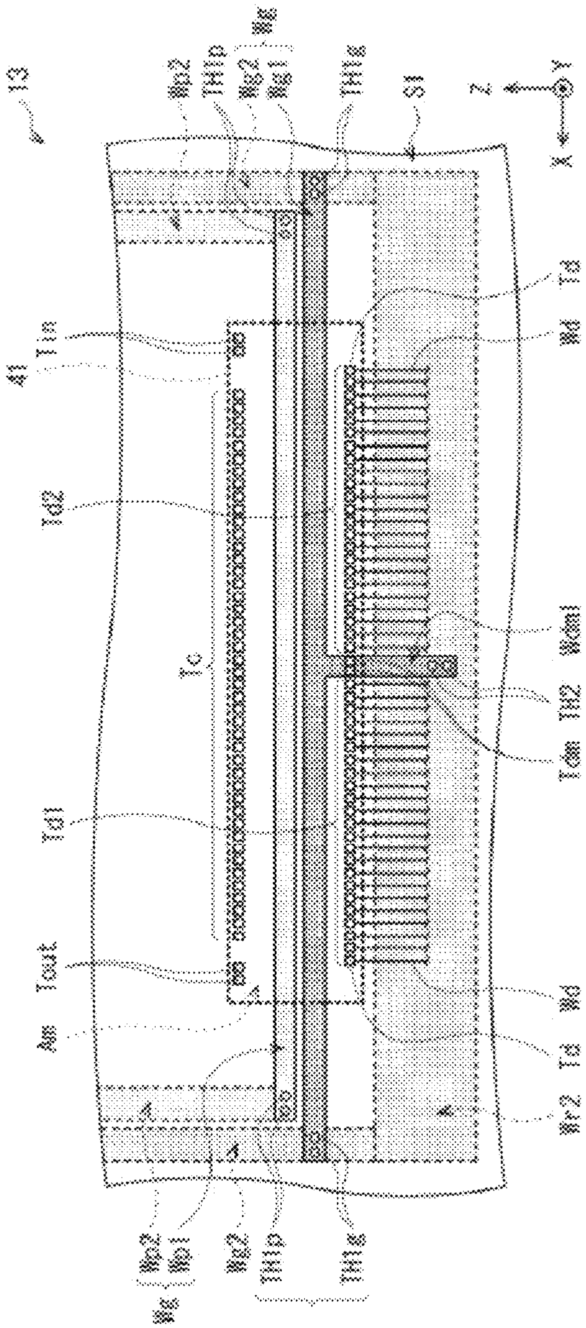
FIG. 7 is a plan view schematically showing a detailed configuration example of the flexible board according to the embodiment.
Figure 8:
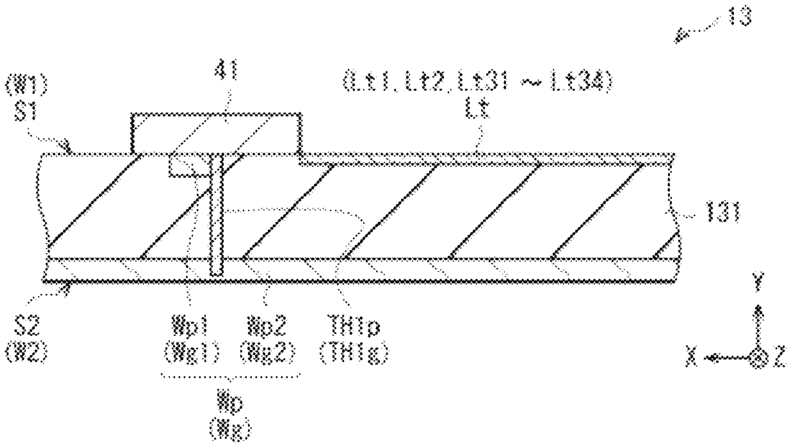
FIG. 8 is a cross-sectional view schematically showing the configuration example shown in FIG. 7.

FIG. 4A and FIG. 4B are plan views (Z-X plane views) schematically showing a detailed configuration example of the flexible boards 13*a* through 13*d* shown in FIG. 2 and FIG. 3. Specifically, FIG. 4A shows a planar configuration example (a Z-X planar configuration example) of the flexible boards 13*a*, 13*c*, and FIG. 4B shows a planar configuration example (a Z-X planar configuration example) of the flexible boards 13*b*, 13*d*. Further, FIG. 5 is a plan view (a Z-X plane view) schematically showing an arrangement configuration example of wiring lines and so on in the flexible boards 13*b*, 13*d* shown in FIG. 4B. FIG. 6 is a plan view (a Z-X plane view) schematically showing a detailed configuration example of the drive device 41 according to the present embodiment (a configuration example when viewed from a reverse surface S2 side described later). FIG. 7 is a plan view (a Z-X plane view) schematically showing a detailed configuration example of the flexible boards 13 (13*a* through 13*d*) related to the present embodiment (a configuration example when viewed from an obverse surface S1 side described later). Further, FIG. 8 is a cross-sectional view (an X-Y cross-sectional view) schematically showing the configuration example shown in FIG. 7.

It should be noted that in FIG. 5, the flexible boards 13*b*, 13*d* are each shown with a collective reference of the flexible board 13. Further, in FIG. 5 described above, there is shown a configuration example of the case of the flexible boards 13*b*, 13*d*, but basically the same configuration is adopted in the case of the flexible boards 13*a*, 13*c* described above. Therefore, in each of FIG. 7 and FIG. 8, the flexible boards 13*a* through 13*d* are each represented by the flexible board 13 as a collective reference of the flexible boards 13*a* through 13*d*, and are each hereinafter described arbitrarily as the flexible board 13. Further, in FIG. 8, differential lines Lt1, Lt2, and Lt31 through Lt34 described later are each shown with a collective reference of a differential line Lt, and are each hereinafter described arbitrarily as the differential line Lt.

First, as shown in each of FIG. 4A, FIG. 4B, and FIG. 5, the following members are provided to each of these flexible boards 13*a* through 13*d*. That is, there are provided a coupling electrode 130, a first input terminal Tin1, a second input terminal Tin2, the differential lines Lt1, Lt2, and Lt31 through Lt34, the plurality of (five in this example) drive devices 41, and the clamping electrodes 433 described above.

The coupling electrodes 130 are disposed in an end portion area at the I/F board 12 side in each of the flexible boards 13*a* through 13*d*, and are electrodes for electrically coupling each of the flexible boards 13*a* through 13*d* and the I/F board 12 to each other.

It is arranged that transmission data Dt (the print control signal Sc described above) transmitted from the outside (the print control section 2 described above) of the inkjet head 1 is input to each of the first input terminal Tin1 and the second input terminal Tin2 (see FIG. 1, FIG. 2, FIG. 4A, FIG. 4B, and FIG. 5). Further, it is arranged that such transmission data Dt is transmitted to the inside of each of the flexible boards 13*a* through 13*d* via one of the first input terminal Tin1 and the second input terminal Tin2. Specifically, as shown in, for example, FIG. 4A, it is arranged that in each of the flexible boards 13*a*, 13*c*, the transmission data Dt is transmitted to the inside of each of the flexible boards 13*a*, 13*c* via the first input terminal Tin1. Meanwhile, as shown in, for example, FIG. 4B and FIG. 5, it is arranged that in each of the flexible boards 13*b*, 13*d*, the transmission data Dt is transmitted to the inside of each of the flexible boards 13*b*, 13*d* via the second input terminal Tin2.

The five drive devices 41 described above are mounted on each of the flexible boards 13*a* through 13*d* (at the obverse surface S1 side out of the obverse surface S1 and the reverse surface S2) in the example shown in FIG. 4A, FIG. 4B, and FIG. 5. As such five drive devices 41 as described above, there are disposed the drive devices 411 through 415, respectively, in the example shown in FIG. 4A, FIG. 4B, and FIG. 5. Further, these five drive devices 41 are arranged in series (cascaded) to each other on the obverse surface S1 described above between the first input terminal Tin1 and the second input terminal Tin2 via a plurality of differential lines described later. Specifically, as shown in FIG. 4A, FIG. 4B, and FIG. 5, the drive devices 411 through 415 are arranged in series in this order from the first input terminal Tin1 side toward the second input terminal Tin2 in all of the flexible boards 13*a* through 13*d*. In other words, the drive device 411 is located at one end of the serial arrangement of such drive devices 41, and at the same time, the drive device 415 is located at the other end of this serial arrangement. Further, the plurality of (three in this example) drive devices 412 through 414 is located between these drive devices 411, 415. Each of these five drive devices 41 is arranged to generate the drive signal Sd described above based on the transmission data Dt input via one of the first input terminal Tin1 and the second input terminal Tin2 as described above. It should be noted that the drive signals Sd generated in such a manner are arranged to be supplied to the jet section 11 side respectively via the clamping electrodes 433 described above on each of the flexible boards 13*a* through 13*d*.

Further, a plurality of transmission lines (differential lines) for transmitting the transmission data Dt via the five drive devices 41 arranged in series to each other is arranged between the first input terminal Tin1 and the second input terminal Tin2. In other words, the differential lines are lines for transmitting the transmission data Dt as differential signals toward each of the drive devices 41. Specifically, as shown in FIG. 4A, FIG. 4B, and FIG. 5, the differential line Lt1 is arranged between the first input terminal Tin1 and the drive device 411, and the differential line Lt2 is arranged between the second input terminal Tin2 and the drive device 415. Further, the differential line Lt31 is arranged between the drive devices 411, 412, and the differential line Lt32 is arranged between the drive devices 412, 413. The differential line Lt33 is arranged between the drive devices 413, 414, and the differential line Lt34 is arranged between the drive devices 414, 415.

Here, as described above, the input terminal (the first input terminal Tin1 or the second input terminal Tin2) to which the transmission data Dt is input is different (see FIG. 4A, FIG. 4B, and FIG. 5) between the flexible boards 13*a*, 13*c* and the flexible boards 13*b*, 13*d*. Further, in accordance therewith, the transmission direction inside the board of the transmission data Dt having been input is different between the flexible boards 13*a*, 13*c* and the flexible boards 13*b*, 13*d*. Specifically, it is arranged that the transmission data Dt having been input from the first input terminal Tin1 is transmitted in the order of the drive devices 411 through 415 (see FIG. 4A) in each of the flexible boards 13*a*, 13*c*. In contrast, it is arranged that the transmission data Dt having been input from the second input terminal Tin2 is transmitted in the order of the drive devices 415 through 411 (see FIG. 4B and FIG. 5) in each of the flexible boards 13*b*, 13*d*.

In such a manner, the input terminal to which the transmission data Dt is input and an output terminal from which the transmission data Dt is output are different between the flexible boards 13*a*, 13*c* and the flexible boards 13*b*, 13*d*. It should be noted that the flexible boards 13*a*, 13*c* and the flexible boards 13*b*, 13*d* are made the same in the structure of the board itself as each other, and the configurations of the flexible boards 13*a* through 13*d* are commonalized (shared) (see FIG. 4A, FIG. 4B, and FIG. 5). In other words, there is no need to prepare a plurality of types of flexible boards (drive boards) in accordance with the transmission direction of the transmission data Dt and so on, and it results in that there is disposed only a single type of flexible board 13 (drive board) in the inkjet head 1.

Further, as shown in FIG. 5, on the flexible board 13, there is arranged a driving constant-potential line Ld for supplying a predetermined constant-potential for driving to the drive devices 41 (the drive devices 411 through 415). As the driving constant-potential line Ld, there are disposed (see FIG. 6) constant-potential wiring lines Wv for supplying predetermined constant potentials Vv although the details will be described later. Further, the constant-potential wiring lines Wv include a power-supply wiring line Wp for supplying a power-supply potential Vp as the constant potential Vv, and a ground wiring line Wg for supplying a ground potential Vg as the constant potential Vv (see FIG. 6). Further, on each of the flexible boards 13 (the reverse surfaces S2), there is disposed a component arrangement area 40 in which a variety of components other than the drive devices 41 are arranged.

Further, as shown in FIG. 8, the flexible boards 13 are each formed as a double-sided board with a double-layered structure having the obverse surface S1 and the reverse surface S2 described above. Specifically, the flexible boards 13 each have a first wiring layer W1 at the obverse surface S1 side and a second wiring layer W2 at the reverse surface S2 side opposed to each other along a direction (the Y-axis direction) perpendicular to the board surfaces (a Z-X plane) as wiring layers of such a double-layered structure.

(Drive Devices 41)

First, as shown in FIG. 7 and FIG. 8, the drive devices 41 (the drive devices 411 through 415) described above are mounted on the first wiring layer W1 at the obverse surface S1 side in each of the flexible boards 13. Specifically, in the present embodiment, each of the drive devices 41 is mounted using flip-chip mounting on the board surface (the obverse surface S1) of the flexible board 13 via a variety of terminals (bumps) described later. It should be noted that in FIG. 6 and FIG. 7, there is shown a mounting target area Am (a mounting area of the drive device 41 on the flexible board 13) to the board surface in the drive device 41.

In the example shown in FIG. 6 and FIG. 7, such a drive device 41 has an internal circuit 410, two data input terminals Tin, two output terminals Tout, a plurality of control terminals Tc, a plurality of drive terminals Td, a plurality of constant-potential terminals Tv, and two dummy terminals Tdm.

As shown in FIG. 6, the internal circuit 410 extends along the longitudinal direction (the X-axis direction) of the drive device 41 in an area (an internal area) between the plurality of control terminals Tc described later and the plurality of drive terminals Td. The internal circuit 410 is a portion including a variety of circuits (circuits for generating the drive signals Sd and so on) in the drive device 41.

To the data input terminals Tin and the data output terminals Tout, there are coupled the differential lines Lt described above, and it is arranged that the transmission data Dt is transmitted via the differential lines Lt. Specifically, it is arranged that the transmission data Dt is input to the data input terminals Tin via the differential lines Lt, and the transmission data Dt is output from the data output terminals Tout via the differential lines Lt. In the example shown in FIG. 6 and FIG. 7, these data input terminals Tin and these data output terminals Tout are arranged around the both ends along the longitudinal direction (the X-axis direction) of the drive device 41 at the input side (a positive direction side along the Z axis) of the drive device 41.

The control terminals Tc are terminals for electrically coupling control wiring lines (wiring lines for performing a variety of types of control to the drive devices 41) on the flexible board 13 to each of the drive devices 41. In the example shown in FIG. 6 and FIG. 7, the plurality of control terminals Tc is arranged side by side along the longitudinal direction of the drive device 41 at the input side (an area between the data input terminals Tin and the data output terminals Tout) of the drive device 41.

The drive terminals Td are terminals for electrically coupling the wiring lines (drive signal wiring lines Wd; see FIG. 7) for individually transmitting the drive signals Sd, to the drive device 41. In the example shown in FIG. 6 and FIG. 7, the plurality of (e.g., 128) drive terminals Td is arranged side by side along the longitudinal direction of the drive device 41 at the output side (a negative direction side along the Z axis) of the drive device 41. Further, in the example shown in FIG. 6 and FIG. 7, these drive terminals Td are divided (grouped) into a plurality of drive terminal groups (two drive terminal groups Td1, Td2) arranged along the longitudinal direction of the drive device 41. It should be noted that as an example, these drive terminal groups Td1, Td2 are each configured including 64 drive terminals Td.

The constant-potential terminals Tv are each a terminal for electrically coupling the constant-potential wiring line Wv for supplying the predetermined constant potentials Vv (the power-supply potential Vp or the ground potential Vg) described above, to the drive device 41. In the example shown in FIG. 6, the constant-potential terminals Tv have the plurality of power-supply terminals Tp and the plurality of ground terminals Tg. Further, in the example shown in FIG. 6, as described above, the constant-potential wiring lines Wv include the power-supply wiring line Wp for supplying the power-supply potential Vp, and the ground wiring line Wg for supplying the ground potential Vg.

In the example shown in FIG. 6, the plurality of power-supply terminals Tp and the plurality of ground terminals Tg are arranged side by side along the longitudinal direction of the drive device 41 in an area between the plurality of control terminals Tc and the plurality of drive terminals Td in the drive device 41. Specifically, the power-supply terminals Tp and the ground terminals Tg are respectively arranged adjacent to the drive terminal groups Td1, Td2 described above in the mounting target area Am in the drive device 41. It should be noted that in the present embodiment, since the drive device 41 is mounted on the board surface using the flip-chip mounting, some of the power-supply terminals Tp and the ground terminals Tg are also arranged in the arrangement area of the internal circuit 410 in the drive device 41.

Further, as shown in FIG. 6, the power-supply wiring line Wp extends along the arrangement position (the longitudinal direction; the X-axis direction) of the plurality of power-supply terminals Tp in the drive device 41, and at the same time, the ground wiring line Wg extends along the arrangement position (the longitudinal direction) of the plurality of ground terminals Tg in the drive device 41. It is arranged that the power-supply potential Vp and the ground potential Vg are individually supplied to the drive devices 41 from the power-supply wiring line Wp (a first power-supply wiring line Wp1 described later) and the ground wiring line Wg (a first ground wiring line Wg1 described later) via the power-supply terminals Tp and the ground terminals Tg.

Although the details will be described later, the dummy terminals Tdm are configured so as to be able to electrically be coupled to the predetermined constant potentials Vv, and are terminals which are not electrically coupled to the internal circuit 410 of the drive device 41. In the example shown in FIG. 6 and FIG. 7, the dummy terminals Tdm are arranged in at least one position (a position between the two drive terminal groups Td1, Td2) out of intervals between the plurality of drive terminal groups in the drive device 41.

It should be noted that in the example shown in FIG. 6 and FIG. 7, there are disposed the two dummy terminals Tdm, but the number of the dummy terminals Tdm is not limited, and can be, for example, one, or three or more. Further, in the example shown in FIG. 6 and FIG. 7, these dummy terminals Tdm are arranged side by side on a straight line in the same direction as the extending direction (the X-axis direction) of the drive terminal groups Td1, Td2, but such an arrangement example is not a limitation. Specifically, it is possible to arrange that, for example, the dummy terminals Tdm are arranged so as to slightly be shifted from the straight line in the extending direction in the drive terminal groups Td1, Td2.

Further, in the present embodiment, since the drive device 41 is mounted on the board surface using the flip-chip mounting, it is desirable for the bumps implemented to the respective terminals to evenly be pressurized when mounting the drive device 41. Therefore, the bumps in the dummy terminals Tdm located between the two drive terminal groups Td1, Td2 are conducive to performing such even pressurization.

(Differential Lines Lt)

The differential lines Lt (the differential lines Lt1, Lt2, and Lt31 through Lt34) are each arranged in the first wiring layer W1 at the obverse surface S1 side in the flexible boards 13 as shown in FIG. 6 through FIG. 8. As described above, these differential lines Lt are lines for transmitting the transmission data Dt as the differential signals, and are formed using, for example, LVDS (Low Voltage Differential Signaling). It should be noted that it is possible for each of the differential lines Lt to be formed using, for example, CML (Current Mode Logic) or ECL (Emitter Coupled Logic). Further, these differential lines Lt are each formed using, for example, a so-called microstrip line or a coplanar line.

It should be noted that it is possible to arrange that a variety of components (e.g., a capacitance for AC coupling which becomes necessary when the common voltage is different between an output side device and an input side device), through holes, and so on are arranged on such differential lines Lt. Further, when it is arranged to arrange the through holes, it is possible to arrange to arrange the through holes in the vicinity of the variety of types of power-supply wiring lines Wp and the ground wiring lines Wg in order to perform the impedance control on the through holes.

(Variety of Wiring Lines ETC.)

Then, the variety of wiring lines and so on on the flexible board 13 will be described in detail with reference to FIG. 6 through FIG. 8.

As shown in FIG. 7, on the periphery of the drive device 41 in the flexible board 13, there are arranged the plurality of drive signal wiring lines Wd, the power-supply wiring lines Wp and the ground wiring lines Wg as the constant-potential wiring lines Wv described above, a dummy terminal coupling wiring line Wdm1, and a return wiring line Wr2.

As shown in FIG. 7, the plurality of drive signal wiring lines Wd is electrically coupled individually to the plurality of drive terminals Td in the drive device 41. Such drive signal wiring lines Wd are each arranged in the first wiring layer W1 at the obverse surface S1 side in the flexible board 13 together with the drive device 41 (see FIG. 8).

The power-supply wiring lines Wp are electrically coupled to the power-supply terminals Tp (see FIG. 6) in the drive device 41, and the power-supply potential Vp described above is applied to the power-supply wiring lines Wp. As shown in FIG. 7 and FIG. 8, the power-supply wiring lines Wp include a first power-supply wiring line Wp1 arranged in the first wiring layer W1, and a second power-supply wiring line Wp2 arranged in the second wiring layer W2. As described above with reference to FIG. 6, the first power-supply wiring line Wp1 extends along the longitudinal direction (the X-axis direction) of the drive device 41 via the reverse surface side of the drive device 41 on the obverse surface S1 of the flexible board 13 (see FIG. 7). The second power-supply wiring line Wp2 is electrically coupled to the first power-supply wiring line Wp1 via first through holes TH1*p* (see FIG. 7 and FIG. 8), and extends along a direction along a shorter dimension of the drive device 41 (the Z-axis direction).

The ground wiring lines Wg are electrically coupled to the ground terminals Tg (see FIG. 6) in the drive device 41, and the ground potential Vg described above is applied to the ground wiring lines Wg. As shown in FIG. 7 and FIG. 8, the ground wiring lines Wg include a first ground wiring line Wg1 arranged in the first wiring layer W1, and a second ground wiring line Wg2 arranged in the second wiring layer W2. As described above with reference to FIG. 6, the first ground wiring line Wg1 extends along the longitudinal direction of the drive device 41 via the reverse surface side of the drive device 41 on the obverse surface S1 of the flexible board 13 (see FIG. 7). The second ground wiring line Wg2 is electrically coupled to the first ground wiring line Wg1 via first through holes TH1*g* (see FIG. 7 and FIG. 8), and extends along the direction along the shorter dimension of the drive device 41.

The dummy terminal coupling wiring line Wdm1 is arranged in the first wiring layer W1, and is electrically coupled to the dummy terminals Tdm (see FIG. 6) in the drive device 41. As shown in FIG. 7, the dummy terminal coupling wiring line Wdm1 extends along the direction along the shorter dimension of the drive device 41 (the Z-axis direction) via the dummy terminals Tdm. Further, one end side of the dummy terminal coupling wiring line Wdm1 is electrically coupled to the first ground wiring line Wg1 described above, and at the same time, the other end side of the dummy terminal coupling wiring line Wdm1 is electrically coupled to the return wiring line Wr2 described below via second through holes TH2 (see FIG. 7).

The return wiring line Wr2 is arranged in the second wiring layer W2, and is a wiring line electrically coupled to the common electrode described above in the inkjet head 1. As shown in FIG. 7, the return wiring line Wr2 extends along the longitudinal direction (the X-axis direction) of the drive device 41 so as to overlap the arrangement area of the plurality of drive signal wiring lines Wd at the output side (the plurality of drive terminals Td side) of the drive device 41. The both end sides along the extending direction of such a return wiring line Wr2 are each electrically coupled to the second ground wiring line Wg2. Further, as described above, the return wiring line Wr2 is electrically coupled to the dummy terminal coupling wiring line Wdm1 via the second through holes TH2, and at the same time, the dummy terminal coupling wiring line Wdm1 is also electrically coupled to the first ground wiring line Wg1 as described above. Due to these circumstances, it is arranged that the ground potential Vg is applied to each of the dummy terminal coupling wiring line Wdm1 and the return wiring line Wr2 via the ground wiring lines Wg.

Here, the flexible boards 13 (13*a* through 13*d*) described above each correspond to a specific example of a "drive board" in the present disclosure. Further, the obverse surface S1 and the first wiring layer W1 each correspond to a specific example of a "first wiring layer" in the present disclosure, and the reverse surface S2 and the second wiring layer W2 each correspond to a specific example of a "second wiring layer" in the present disclosure. Further, the power-supply wiring lines Wp and the ground wiring lines Wg each correspond to a specific example of a "constant-potential wiring line" in the present disclosure, and the power-supply potential Vp and the ground potential Vg described above each correspond to a specific example of the "predetermined potential" in the present disclosure. Further, the power-supply terminals Tp and the ground terminals Tg each correspond to a specific example of a "constant-potential terminal" in the present disclosure. Further, the first power-supply wiring line Wp1 and the first ground wiring line Wg1 each correspond to a specific example of a "first constant-potential wiring line" in the present disclosure, and the second power-supply wiring line Wp2 and the second ground wiring line Wg2 each correspond to a specific example of a "second constant-potential wiring line" in the present disclosure.

Operations and Functions/Advantages

A. Basic Operation of Printer 5

In the printer 5, a recording operation (a printing operation) of images, characters, and so on to the recording target medium (the recording paper P or the like) is performed using such a jet operation of the ink 9 by the inkjet head 1 as described below. Specifically, in the inkjet head 1 according to the present embodiment, the jet operation of the ink 9 using a shear mode is performed in the following manner.

First, the drive devices 41 on each of the flexible boards 13*a*, 13*b*, 13*c*, and 13*d* each apply the drive voltages Vd (the drive signals Sd) to the drive electrodes (the common electrodes and the active electrodes) described above in the actuator plate 111 in the jet section 11. Specifically, each of the drive devices 41 applies the drive voltage Vd to the drive electrodes disposed on the pair of drive walls partitioning the ejection channel described above. Thus, the pair of drive walls each deform so as to protrude toward the dummy channel adjacent to the ejection channel.

On this occasion, it results in that the drive wall makes a flexion deformation to have a V shape centering on the intermediate position in the depth direction in the drive wall. Further, due to such a flexion deformation of the drive wall, the ejection channel deforms as if the ejection channel bulges. As described above, due to the flexion deformation caused by a piezoelectric thickness-shear effect in the pair of drive walls, the volume of the ejection channel increases. Further, by the volume of the ejection channel increasing, the ink 9 is induced into the ejection channel as a result.

Subsequently, the ink 9 induced into the ejection channel in such a manner turns to a pressure wave to propagate to the inside of the ejection channel. Then, the drive voltage Vd to be applied to the drive electrodes becomes 0 (zero) V at the timing at which the pressure wave has reached the nozzle hole Hn of the nozzle plate 112 (or timing around that timing). Thus, the drive walls are restored from the state of the flexion deformation described above, and as a result, the volume of the ejection channel having once increased is restored again.

In such a manner, the pressure inside the ejection channel increases in the process that the volume of the ejection channel is restored, and thus, the ink 9 in the ejection channel is pressurized. As a result, the ink 9 shaped like a droplet is ejected (see FIG. 1) toward the outside (toward the recording paper P) through the nozzle hole Hn. The jet operation (the ejection operation) of the ink 9 in the inkjet head 1 is performed in such a manner, and as a result, the recording operation of images, characters, and so on to the recording paper P is performed.

B. Functions/Advantages in Inkjet Head 1

Then, the functions and the advantages in the inkjet head 1 according to the present embodiment will be described in detail.

B-1. Regarding Configuration Example of Related-Art Drive Board

First, in a drive board used in a general inkjet head in the related art, from a requirement of making a number of nozzle holes operate at the same time, the following configuration is adopted. That is, an extremely large number of individual wiring lines are arranged on the drive board from drive devices for outputting signals (drive signals) for driving the nozzle holes toward an actuator plate. Further, a common wiring line corresponding to the individual wiring lines is also required to be arranged on the drive board.

Since the common wiring line is a return path with respect to the individual wiring lines, in the related-art drive board, for example, the following is arranged. That is, first, it is necessary for each of the individual wiring lines and the common wiring line to be coupled to the actuator plate, and at the same time, it is necessary for the common wiring line to be coupled to a power supply, the drive devices, and so on at the input side while passing through any path. Further, regarding the individual wiring lines to be coupled to the actuator plate, when, for example, the drive devices each have a rectangular shape, it results in that the plurality of individual wiring lines corresponding to the number of the nozzle holes is arranged side by side along the longitudinal direction of the drive devices. In contrast, a ground wiring line to be coupled to the common wiring line exists only at both ends of the drive board.

In such an arrangement of the common wiring line, the following problem can occur when, for example, the number of the drive devices increases, or in accordance with an increase in the length in the longitudinal direction of the drive devices. That is, since the common wiring line only exists at the both ends of the drive board, a difference in electrical characteristic caused by a difference in length of the return path increases between nozzle holes to be connected to the individual wiring lines close to the common wiring line and nozzle holes to be connected to the individual wiring lines far from the common wiring line. Therefore, a difference in ejection performance of the ink increases between the nozzle holes short in distance from the common wiring line and the nozzle holes far therefrom, and it ultimately results in that the deterioration of the printing quality is incurred.

Further, from a viewpoint of heat radiation, a problem can occur. For example, when the drive devices drive the nozzle holes to thereby generate heat, the heat radiation path only exists in the ground wiring line located at both sides of the drive devices in the related-art drive board described above. Therefore, since the distance from the heat radiation path is different between the both sides and the vicinity of the center of the drive devices, it results in that the temperature environment is different between the both ends and the vicinity of the center in the drive devices. Therefore, since the heat of the drive devices propagates to the actuator plate to cause a temperature unevenness in the actuator plate, a difference in the performance of an analog circuit in the drive devices, and so on, it results in that the ejection performance is different in a nozzle array, and thus, the printing quality is affected.

Due to these circumstances, it can be said that in the configuration example of the related-art drive board, it becomes difficult to ensure the stable operations of the drive devices, and there is a possibility of incurring the degradation of the reliability.

B-2. Functions/Advantages

In contrast, in the inkjet head 1 according to the present embodiment, since the following configuration is adopted, it is possible to obtain, for example, the following functions and advantages.

That is, first, in the inkjet head 1 described above, the dummy terminals Tdm which can electrically be coupled to the predetermined constant potential Vv are disposed at at least one position (the position between the two drive terminal groups Td1, Td2) out of the intervals between the plurality of drive terminal groups in each of the drive devices 41. Thus, for example, it becomes possible to supply the constant potential Vv (e.g., the power-supply potential Vp or the ground potential Vg) to the inside of the drive device 41 from the position adjacent to these drive terminal groups Td1, Td2, and thus it becomes possible to ensure the stable operations of the drive devices 41. As a result, in the present embodiment, it becomes possible to improve the reliability of the drive devices 41 (as well as the flexible boards 13, the inkjet head 1, and so on).

Further, in the present embodiment, since such dummy terminals Tdm are not coupled to the internal circuit 410 in each of the drive devices 41, it is possible to set a variety of potentials as the constant potential Vv to be applied to the dummy terminals Tdm. Further, since the arrangement freedom of the dummy terminals Tdm in each of the drive devices 41 increases, when the drive devices 41 are mounted on the flexible board 13, the arrangement freedom of circuits and wiring lines on the flexible board 13 also increases, and thus, the wiring efficiency on the flexible board 13 increases. As a result, in the present embodiment, it becomes possible to achieve a reduction in size of the flexible board 13. Further, since the constant-potential terminals Tv are arranged at the positions adjacent to the drive terminal groups Td1, Td2 in the mounting target area Am to the board surface (the obverse surface S1) of the drive device 41, it is possible to reduce, for example, the return path to the drive device 41 via the dummy terminals Tdm to which the constant potential Vv is applied. As a result, in the present embodiment, it becomes possible to further improve the reliability.

Further, in the present embodiment, since the dummy terminal coupling wiring line Wdm1 and the constant-potential wiring lines Wv are electrically coupled to each other, it results in that the area of the wiring line for supplying the constant potential Vv to the drive device 41 increases. Thus, it results in that the power supply to be supplied to the drive devices 41 is reinforced, and at the same time, the heat radiation paths to the drive devices 41 are also reinforced in accordance with such reinforcement of the power supply. As a result, a further stable operation of the drive devices 41 is realized, and it becomes possible to further improve the reliability.

In addition, in the present embodiment, the constant-potential wiring lines Wv include the first constant-potential wiring lines (the first power-supply wiring line Wp1 and the first ground wiring line Wg1) on the first wiring layer W1, and the second constant-potential wiring lines (the second power-supply wiring line Wp2 and the second ground wiring line Wg2) on the second wiring layer W2. Further, the first constant-potential wiring lines and the second constant-potential wiring lines are electrically coupled to each other via the first through holes TH1*p*, TH1*g*, respectively. Thus, it is possible to supply the constant potentials Vv from a layer (the second wiring layer W2) different from a layer (e.g., the first wiring layer W1 in which the plurality of drive signals Sd exists) in which a number of other wiring lines exist. Therefore, as a result of the fact that it results in that the power supply and the heat radiation paths described above in the drive devices 41 are further reinforced, further stable operations of the drive devices 41 are realized, and it becomes possible to further improve the reliability.

Further, in the present embodiment, since the return wiring line Wr2 is electrically coupled to the second wiring layer W2, and at the same time, also electrically coupled to the dummy terminal coupling wiring line Wdm1 via the second through holes TH2, the following is achieved. That is, since the return path to the drive device 41 is formed not only in, for example, the vicinity of the both ends of the drive device 41, but also in the position (at least one of the plurality of intervals between the drive terminal groups) of the dummy terminals Tdm, a further stable operation of the drive device 41 is realized. Further, since the broad return wiring line Wr2 and the dummy terminal coupling wiring line Wdm1 are electrically coupled to each other, it results in that the heat radiation path of the drive device 41 is also reinforced. Due to these circumstances, in the present embodiment, it becomes possible to achieve further improvement of the reliability.

2. Modified Examples

Then, some modified examples (Modified Examples 1-1, 1-2, 2, and 3) of the embodiment described above will be described. It should be noted that hereinafter, the same constituents as those in the embodiment are denoted by the same reference symbols, and the description thereof will arbitrarily be omitted.

Modified Examples 1-1, 1-2

Configuration

Figure 9:
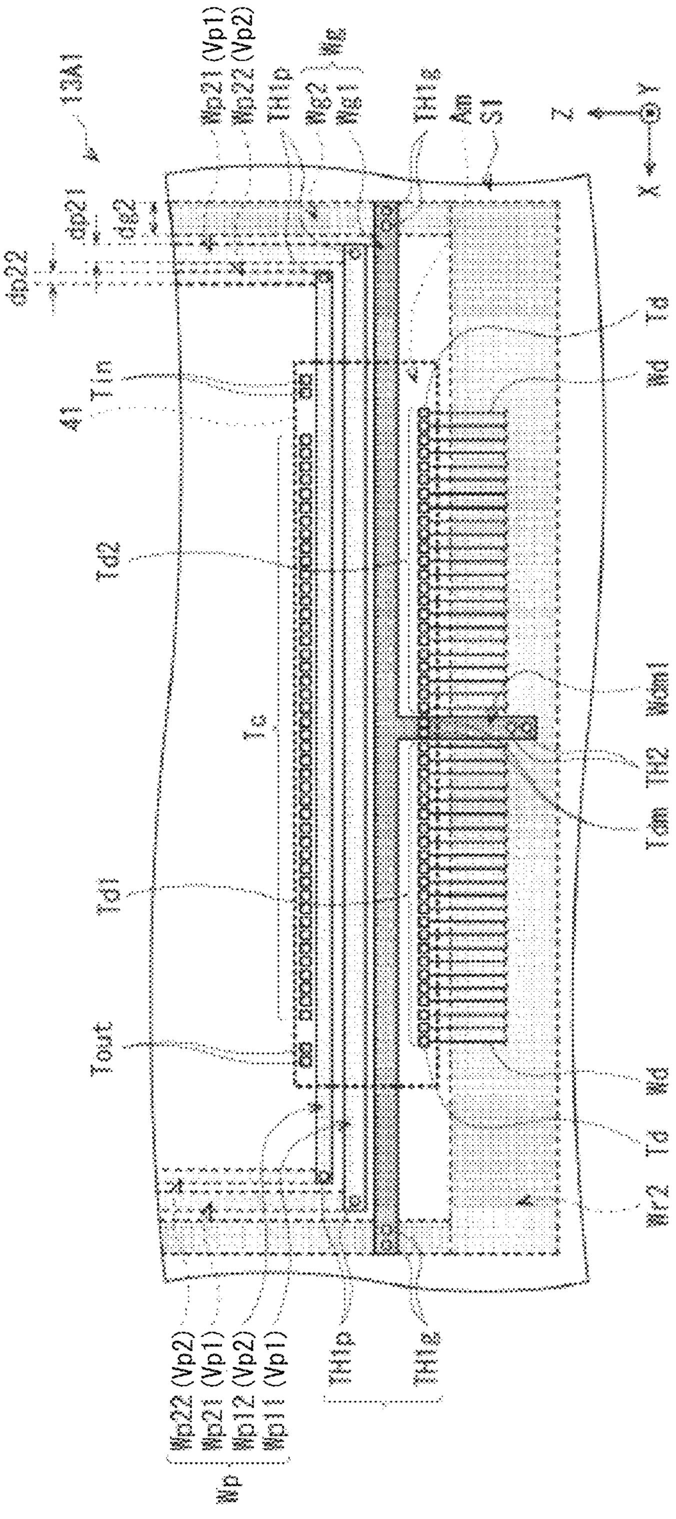
FIG. 9 is a plan view schematically showing a detailed configuration example of a flexible board according to Modified Example 1-1.
Figure 10:
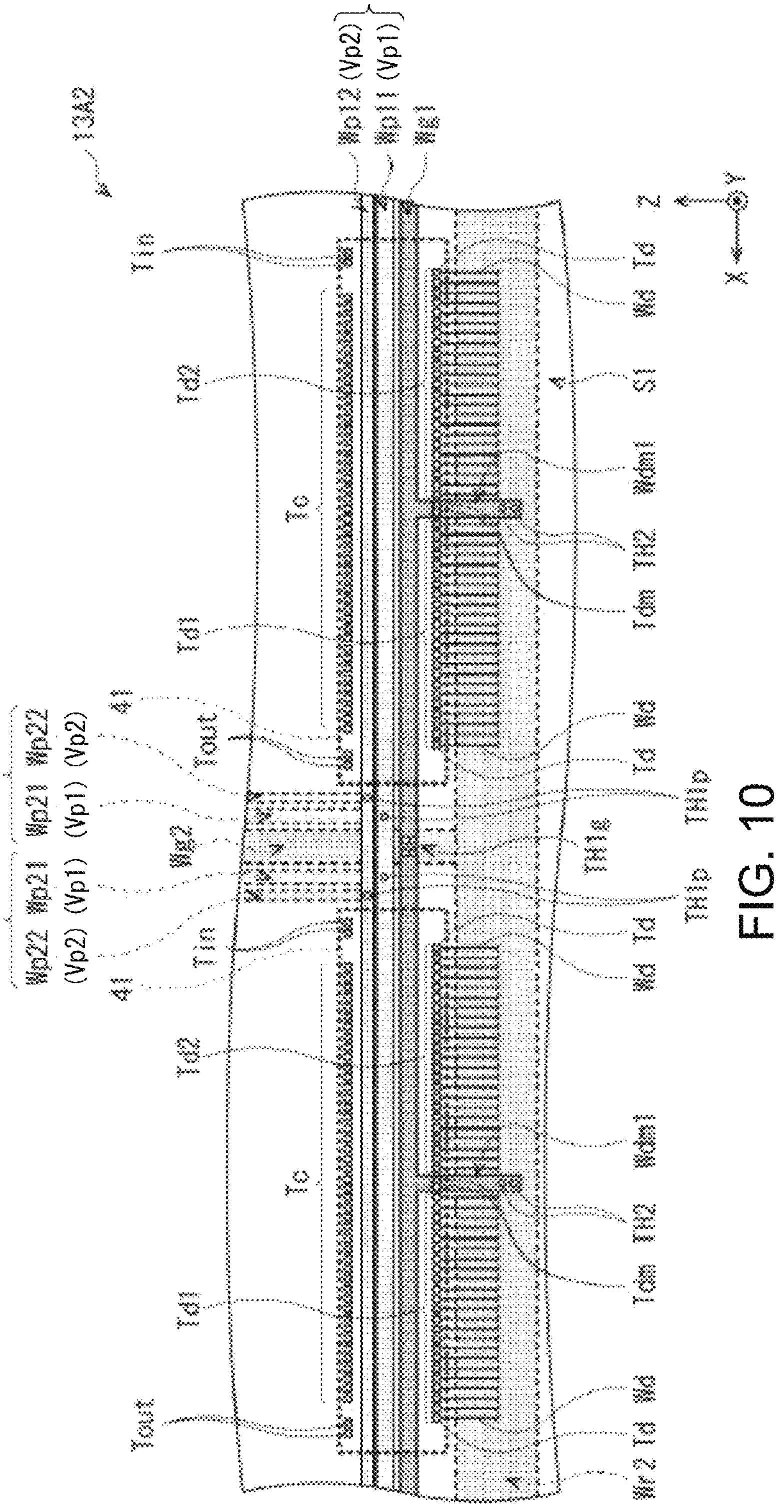
FIG. 10 is a plan view schematically showing a detailed configuration example of a flexible board according to Modified Example 1-2.

FIG. 9 and FIG. 10 are plan views (Z-X plane views) schematically showing detailed configuration examples of the flexible boards 13A1, 13A2 related to Modified Examples 1-1, 1-2 (configuration examples when viewed from the obverse surface S1 side described above). Specifically, in the flexible board 13A1 in Modified Example 1-1 shown in FIG. 9, there is shown a planar configuration example of the periphery of one of the drive devices 41, and in the flexible board 13A2 in Modified Example 1-2 shown in FIG. 10, there is shown a planar configuration example of the periphery of a plurality of (two) drive devices 41.

Here, the flexible boards 13A1, 13A2 related to Modified Examples 1-1, 1-2 described above each correspond to a specific example of the "drive board" in the present disclosure.

As shown in FIG. 9 and FIG. 10, the flexible boards 13A1, 13A2 in Modified Examples 1-1, 1-2 each correspond to what is obtained by disposing a plurality of (two) types of power-supply wiring lines instead of the single type of power-supply wiring line Wp in the flexible board 13 (see FIG. 7) in the embodiment, and are made basically the same in the rest of the configuration.

Specifically, in the flexible boards 13A1, 13A2, two types of first power-supply wiring lines Wp11, Wp12 are arranged on the first wiring layer W1, and two types of second power-supply wiring lines Wp21, Wp22 are arranged on the second wiring layer W2. In other words, the first power-supply wiring lines Wp11, Wp12 are disposed instead of the first power-supply wiring line Wp1 in the flexible board 13, and the second power-supply wiring lines Wp21, Wp22 are disposed instead of the second power-supply wiring line Wp2 in the flexible board 13.

Further, the first power-supply wiring line Wp11 and the second power-supply wiring line Wp21 are electrically coupled to each other via the first through hole TH1*p*, and the first power-supply wiring line Wp12 and the second power-supply wiring line Wp22 are electrically coupled to each other via the first through hole TH1*p*. A power-supply potential Vp1 (e.g., a positive potential) is applied to each of the first power-supply wiring line Wp11 and the second power-supply wiring line Wp21, and a power-supply potential Vp2 (e.g., a negative potential) different from the power-supply potential Vp1 is applied to each of the first power-supply wiring line Wp12 and the second power-supply wiring line Wp22. Thus, it is arranged that it is possible to include, for example, positive and negative voltages as the drive voltages Vd in the drive signals Sd.

It should be noted that the first power-supply wiring lines Wp11, Wp12 and the first ground wiring line Wg1 each correspond to a specific example of the "first constant-potential wiring line" in the present disclosure, and the second power-supply wiring lines Wp21, Wp22 and the second ground wiring line Wg2 each correspond to a specific example of the "second constant-potential wiring line" in the present disclosure. Further, the second power-supply wiring lines Wp21, Wp22 and the second ground wiring line Wg2 each correspond to a specific example of a "plurality of types of wiring lines (included in second constant-potential wiring lines)" in the present disclosure, and the second ground wiring line Wg2 corresponds to a specific example of "a ground wiring line (included in the plurality of types of wiring lines)" in the present disclosure. Further, the power-supply potentials Vp1, Vp2 and the ground potential Vg described above each correspond to a specific example of a "predetermined constant potential" in the present disclosure.

As described above, in the flexible boards 13A1, 13A2, as the second constant-potential wiring lines described above, there are included the plurality of types of wiring lines (the three types of wiring lines; the second power-supply wiring lines Wp21, Wp22, and the second ground wiring line Wg2) to which the constant potentials Vv (the power-supply potentials Vp1, Vp2 and the ground potential Vg) different from each other are applied. Further, as shown in, for example, FIG. 9, a wiring line width dp21 in the second power-supply wiring line Wp21, a wiring line width dp22 in the second power-supply wiring line Wp22, and a wiring line width dg2 in the second ground wiring line Wg2 are different from each other. Specifically, in the examples shown in FIG. 9 and FIG. 10, (wiring line width dp22)<(wiring line width dp21)<(wiring line width dg2) is assumed, and it is assumed that the wiring line width dg2 of the second ground wiring line Wg2 is the largest (thickest) of these three types of wiring lines.

It should be noted that such a magnitude relationship as described above in the wiring line widths dp21, dp22, and dg2 is derived from, for example, the following reason. That is, by appropriately setting the wiring line widths dp21, dp22, and dg2 with respect to allowable current levels of the respective constant potentials Vv (the power-supply potentials Vp1, Vp2 and the ground potential Vg) described above, it becomes possible to make the wiring arrangement to the flexible boards 13A1, 13A2 compact while suppressing the voltage drop when performing the ejection drive. Specifically, in the examples shown in FIG. 9 and FIG. 10, since there is assumed when the allowable current in the second power-supply wiring line Wp21 is higher than the allowable current in the second power-supply wiring line Wp22, the wiring line width dp21 of the second power-supply wiring line Wp21 is made larger than the wiring line width dp22 of the second power-supply wiring line Wp22. Further, this is because since the second ground wiring line Wg2 is used when performing the discharge in the charging state of the actuator plate 111 using the second power-supply wiring lines Wp21, Wp22, it is desirable for the wiring line width dg2 of the second ground wiring line Wg2 to be no smaller than the wiring line width corresponding to a total amount of the allowable currents in the second power-supply wiring lines Wp21, Wp22.

Further, in particular in Modified Example 1-2 shown in FIG. 10, the plurality of drive devices 41 is cascaded to each other via the first constant-potential wiring lines (the first power-supply wiring lines Wp11, Wp12, and the first ground wiring line Wg1) described above in the first wiring layer W1. Further, between the plurality of drive devices 41 in the second wiring layer W2, there are arranged the second constant-potential wiring lines (the second power-supply wiring lines Wp21, Wp22, and the second ground wiring line Wg2) described above. Further, the first constant-potential wiring lines and the second constant-potential wiring lines are electrically coupled to each other individually via the first through holes TH1*p*, TH1*g*, respectively in an area between the plurality of drive devices 41.

Functions/Advantages

In this way, in the flexible boards 13A1, 13A2 in Modified Examples 1-1, 1-2, the wiring line widths (the wiring line widths dp21, dp22, dg2) in the plurality of types of wiring lines (the second power-supply wiring lines Wp21, Wp22 and the second ground wiring line Wg2) included in the second constant-potential wiring lines described above are different from each other. Thus, for example, by setting the wiring line widths corresponding to the levels of the currents flowing through the respective wiring lines, the following is achieved.

In other words, for example, it becomes possible to set the wiring line width relatively thin in the wiring line through which a relatively low current flows, while setting the wiring line width relatively thick in the wiring line through which a relatively high current flows. Thus, it results in that the power supply and the heat radiation path described above in the drive device 41 is further reinforced, and the wiring efficiency on the flexible boards 13A1, 13A2 increases while ensuring the further stable operation of the drive device 41. As a result, it becomes possible to achieve a reduction in size in the flexible boards 13A1, 13A2, and the inkjet head equipped with the flexible boards 13A1, 13A2.

Further, since the wiring line width (the wiring line width dg2) of the ground wiring line (the second ground wiring line Wg2) is set the largest of the wiring line widths of the plurality of types of wiring lines described above, the following is achieved. That is, for example, it becomes possible to set the allowable current of the second ground wiring line Wg2 to be no smaller than the total amount of the allowable currents in other wiring lines (the second power-supply wiring lines Wp21, Wp22). Thus, it is possible to ensure the ground high in quality while increasing the arrangement efficiency of the second constant-potential wiring lines described above, and therefore, it becomes possible to enhance the reliability while achieving the reduction in size.

Further, in particular in Modified Example 1-2, since the plurality of drive devices 41 is cascaded to each other via the first constant-potential wiring lines described above in the first wiring layer W1, and at the same time, the second constant-potential wiring lines described above are arranged between the plurality of drive devices 41 in the second wiring layer W2, the following is achieved. That is, even when the plurality of drive devices 41 is mounted on the board surface, it becomes possible to ensure the efficient return path and heat radiation paths, and thus, it becomes possible to improve the reliability.

It should be noted that in Modified Example 1-2, there is adopted the example when applying the wiring line configuration and so on corresponding to Modified Example 1-1 to the plurality of drive devices 41, but it is possible to arrange that, for example, the wiring line configuration and so on corresponding to the embodiment are applied to the plurality of drive devices 41.

Modified Example 2

Configuration

Figure 11:
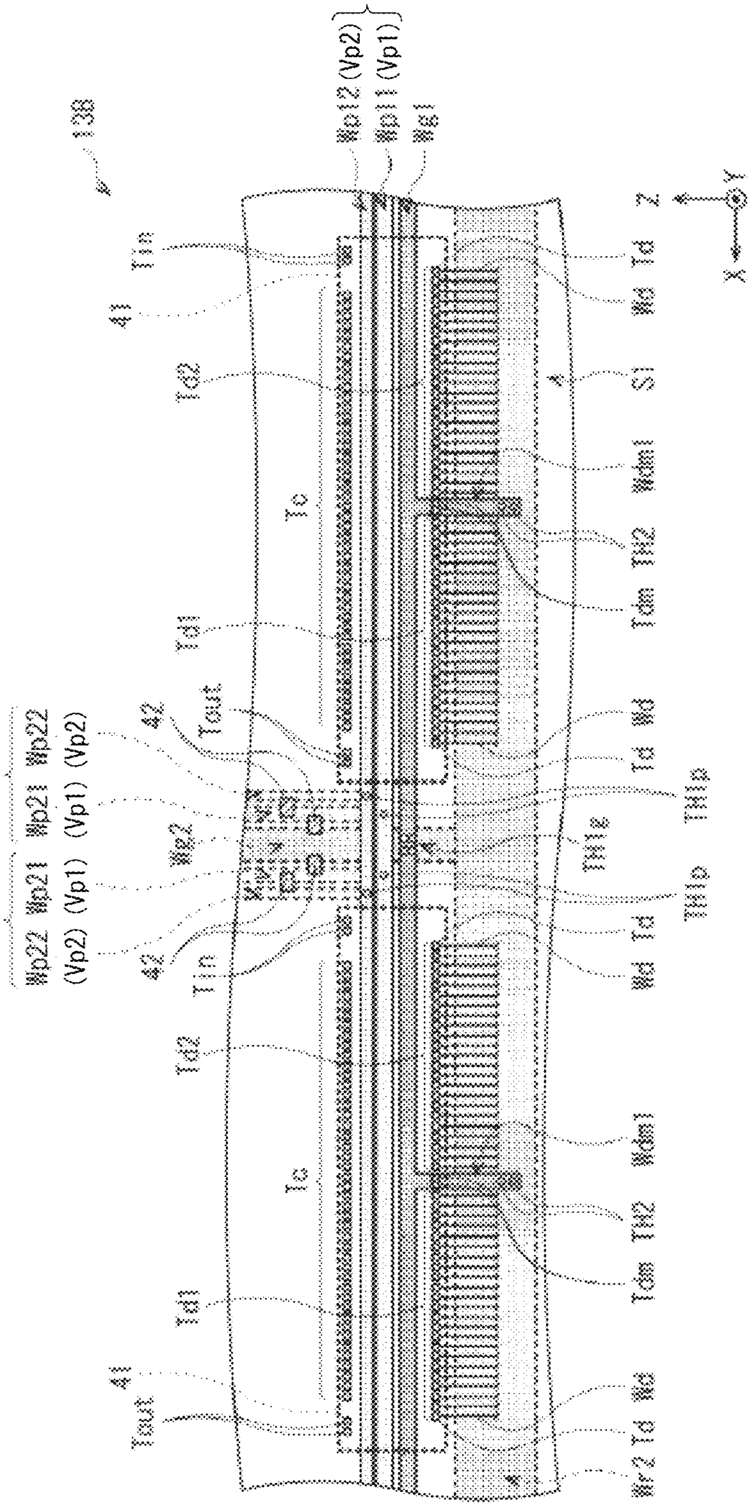
FIG. 11 is a plan view schematically showing a detailed configuration example of a flexible board according to Modified Example 2.

FIG. 11 is a plan view (a Z-X plane view) schematically showing a detailed configuration example of a flexible board 13B related to Modified Example 2 (a configuration example when viewed from the obverse surface S1 side described above). Specifically, in the flexible board 13B in Modified Example 2 described above, there is shown a planar configuration example with respect to the periphery of the plurality of (two) drive devices 41 similarly to the flexible board 13A2 (see FIG. 10) in Modified Example 1-2 described above.

Here, the flexible board 13B related to such Modified Example 2 corresponds to a specific example of the "drive board" in the present disclosure.

As shown in FIG. 11, the flexible board 13B in Modified Example 2 described above corresponds to what is obtained by further providing circuit components 42 described hereinafter in the flexible board 13A1 (see FIG. 10) in Modified Example 1-2, and is made basically the same in the rest of the configuration.

The circuit components 42 are mounted on the second constant-potential wiring lines (the second power-supply wiring lines Wp21, Wp22, and the second ground wiring line Wg2) described above in an area between the plurality of drive devices 41. Specifically, in the example shown in FIG. 11, the circuit components 42 are arranged so as to straddle an area between the second power-supply wiring lines Wp21, Wp22, and at the same time, the circuit components 42 are arranged so as to straddle an area between the second power-supply wiring line Wp21 and the second ground wiring line Wg2.

Such circuit components 42 are configured including, for example, a protective diode and a power-supply filter described below.

First, since the second power-supply wiring line Wp22 to which the power-supply potential Vp2 is applied has a predetermined potential difference with the second power-supply wiring line Wp21 to which the power-supply potential Vp1 is applied, and has a predetermined potential difference with the second ground wiring line Wg2 to which the ground potential Vg is applied, the following, for example, can occur. That is, due to an operation error, a drive noise, and so on, there can occur, for example, that the potential (the power-supply potential Vp2) of the second power-supply wiring line Wp22 becomes higher than the potential (the power-supply potential Vp1) of the second power-supply wiring line Wp21, or becomes lower than the potential (the ground potential Vg) of the second ground wiring line. In such a case, by the protective diodes as the circuit components 42 being disposed between the second power-supply wiring lines Wp21, Wp22, and between the second power-supply wiring line Wp21 and the second ground wiring line Wg2, it becomes possible to prevent such an upset phenomenon of the potentials as described above.

It should be noted that since such protective diodes are the circuit components 42 for protecting the drive devices 41, and are therefore desirably arranged in the vicinity of the drive devices 41, it can be said that the example of the arrangement positions shown in FIG. 11 is appropriate.

Further, in order to prevent an exogenous noise from entering the drive devices 41 from the second power-supply wiring lines Wp21, Wp22 and the second ground wiring line Wg2, it is possible to dispose, for example, the power-supply filter as the circuit components 42. It should be noted that since such a power-supply filter is the circuit component 42 for protecting the drive devices 41, and are therefore desirably arranged in the vicinity of the drive devices 41, it can be said that the example of the arrangement positions shown in FIG. 11 is appropriate.

Functions/Advantages

In this way, in the flexible board 13B in Modified Example 2, since the circuit components 42 (e.g., the protective diodes or the power-supply filter) are mounted on the second constant-potential wiring lines described above, it is possible to implement a variety of circuit functions at positions adjacent to the drive devices 41. As a result, it becomes possible to further improve the reliability of the drive devices 41.

Modified Example 3

Configuration

Figure 12:
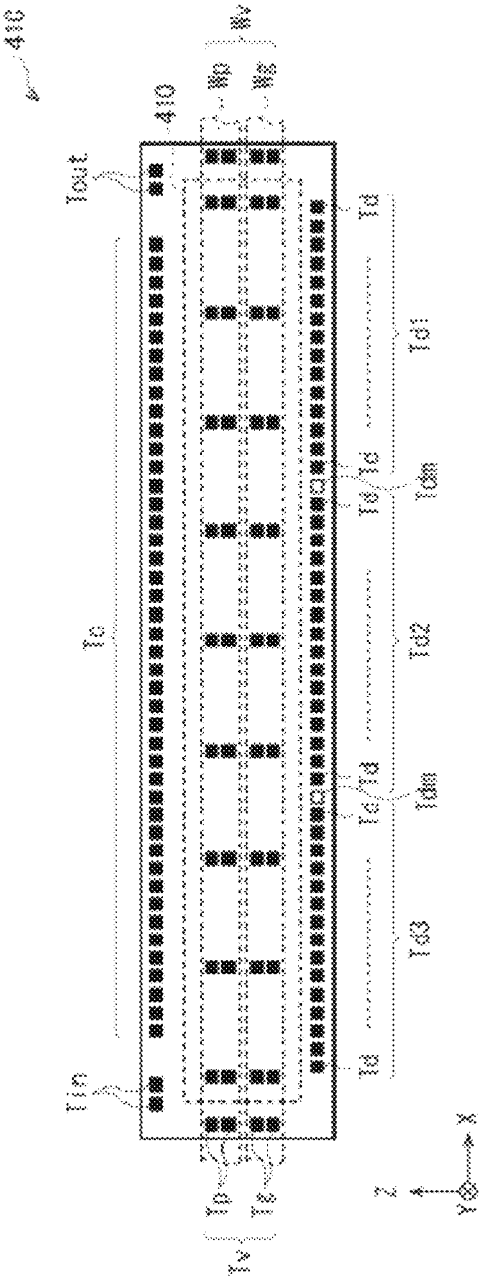
FIG. 12 is a plan view schematically showing a detailed configuration example of a drive device according to Modified Example 3.

FIG. 12 is a plan view (a Z-X plane view) schematically showing a detailed configuration example of a drive device 41C according to Modified Example 3 (a configuration example when viewed from the reverse surface S2 side described above).

The drive device 41C according to Modified Example 3 described above corresponds to what is arranged to dispose three drive terminal groups Td1 through Td3 instead of the two drive terminal groups Td1, Td2 in the drive device 41 (see FIG. 6) according to the embodiment, and is made basically the same in the rest of the configuration.

Specifically, in the drive device 41C, the plurality of drive terminals Td is divided into the three drive terminal groups Td1 through Td3 arranged along the longitudinal direction (the X-axis direction) of the drive device 41C. Further, in the example of the drive device 41C shown in FIG. 12, the dummy terminals Tdm are disposed one by one at a position between the drive terminal groups Td1, Td2, and a position between the drive terminal groups Td2, Td3.

It should be noted that similarly to the embodiment, in Modified Example 3, the number of the dummy terminals Tdm at each position can be one, or two or more. Further, in Modified Example 3 described above, the plurality of drive terminals Td is divided into the three drive terminal groups Td1 through Td3, but this example is not a limitation, and it is possible to arrange that the plurality of drive terminals Td is divided into, for example, four or more drive element groups.

Functions/Advantages

In Modified Example 3 having such a configuration, it is also possible to obtain substantially the same advantages due to basically the same function as that of the embodiment.

3. Other Modified Examples

The present disclosure is described hereinabove citing the embodiment and some modified examples, but the present disclosure is not limited to the embodiment and so on, and a variety of modifications can be adopted.

For example, in the embodiment and so on described above, the description is presented specifically citing the configuration examples (the shapes, the arrangements, the number and so on) of each of the members in the printer and the inkjet head, but those described in the above embodiment and so on are not limitations, and it is possible to adopt other shapes, arrangements, numbers and so on.

Specifically, for example, in the embodiment and so on described above, the description is presented specifically citing the configuration examples (the shapes, the arrangements, the number, and so on) of the flexible boards (the drive boards), the drive devices, the differential lines, a variety of terminals, a variety of wiring lines, and so on, but these configuration examples are not limited to those described in the above embodiment and so on. For example, in the embodiment and so on described above, the description is presented citing when the "drive board" in the present disclosure is the flexible board as an example, but the "drive board" in the present disclosure can also be, for example, an inflexible board. Further, in the embodiment and so on described above, there is described the example when the plurality of drive boards is disposed inside the inkjet head, but this example is not a limitation, and it is possible to arrange that, for example, just one drive board is disposed alone inside the inkjet head. Further, in the embodiment and so on described above, there is described the example when the plurality of drive devices is arranged in series to each other with the cascade connection between the data output terminal Tout and the data input terminal Tin in each of the drive boards, but this example is not a limitation. Specifically, it is possible to arrange that, for example, the plurality of drive devices is connected in parallel to each other (instead of the cascade connection described above), or a single drive device is disposed alone in each of the drive boards. Further, in the embodiment and so on described above, the shape of the drive device is assumed to be the rectangular shape, but this example is not a limitation, and the shape of the drive device can be, for example, a square shape. In addition, in the embodiment and so on described above, the plurality of drive devices is arranged side by side along the longitudinal direction thereof, but this example is not a limitation, and it is possible to arrange that, for example, the plurality of drive devices is not arranged side by side along the longitudinal direction thereof. Further, in the embodiment and so on described above, there is described the example when the drive devices are mounted on the board surface in each of the drive boards using the flip-chip mounting, but this example is not a limitation, and it is possible to arrange that, for example, the drive devices are mounted on the board surface using other mounting methods (insertion mounting with solder, surface mounting, wire bonding mounting, and so on).

Further, the numerical examples of the variety of parameters described in the embodiment and so on described above are not limited to the numerical examples described in the embodiment and so on, and can also be other numerical values.

Further, a variety of types of structures can be adopted as the structure of the inkjet head. Specifically, it is possible to adopt, for example, a so-called side-shoot type inkjet head which ejects the ink 9 from a central portion in the extending direction of each of the ejection channels in the actuator plate 111. Alternatively, it is possible to adopt, for example, a so-called edge-shoot type inkjet head for ejecting the ink 9 along the extending direction of each of the ejection channels. Further, the type of the printer is not limited to the type described in the embodiment and so on described above, and it is possible to apply a variety of types such as an MEMS (Micro Electro-Mechanical Systems) type.

Further, for example, it is possible to apply the present disclosure to either of an inkjet head of a circulation type which uses the ink 9 while circulating the ink 9 between the ink tank and the inkjet head, and an inkjet head of a non-circulation type which uses the ink 9 without circulating the ink 9.

Further, the series of processing described in the above embodiment and so on can be arranged to be performed by hardware (a circuit), or can also be arranged to be performed by software (a program). When arranging that the series of processing is performed by the software, the software is constituted by a program group for making the computer perform the functions. The programs can be incorporated in advance in the computer described above to be used by the computer, for example, or can also be installed in the computer described above from a network or a recording medium to be used by the computer.

Further, in the embodiment and so on described above, the description is presented citing the printer 5 (the inkjet printer) as a specific example of the "liquid jet recording device" in the present disclosure, but this example is not a limitation, and it is also possible to apply the present disclosure to other devices than the inkjet printer. In other words, it is also possible to arrange that the "liquid jet head" (the inkjet head) of the present disclosure is applied to other devices than the inkjet printer. Specifically, it is also possible to arrange that the "liquid jet head" of the present disclosure is applied to a device such as a facsimile or an on-demand printer.

In addition, it is also possible to apply the variety of examples described hereinabove in arbitrary combination.

It should be noted that the advantages described in the present specification are illustrative only, but are not a limitation, and other advantages can also be provided.

Further, the present disclosure can also take the following configurations.

<1> A drive device configured to generate a drive signal to be applied to a liquid jet head having a plurality of nozzles, the drive device comprising a plurality of drive terminals which is arranged along a longitudinal direction of the drive device, and which is configured to individually output the drive signal for jetting liquid from the nozzles; and at least one dummy terminal configured to electrically be coupled to a predetermined constant potential, wherein the plurality of drive terminals is divided into a plurality of drive terminal groups arranged along the longitudinal direction, and the dummy terminal is arranged at at least one of intervals between the plurality of drive terminal groups.

<2> The drive device according to <1>, further comprising an internal circuit including a circuit configured to generate the drive signal; and a constant-potential terminal arranged adjacent to the drive terminal group in a mounting target area to a board surface in the drive device, wherein the dummy terminal fails to be coupled to the internal circuit.

<3> A drive board comprising the at least one drive device according to <1> or <2>, wherein the drive device is mounted on a board surface in the drive device.

<4> The drive board according to <3>, wherein the drive device has a constant-potential terminal, and the drive board further comprises plurality of drive signal wiring lines electrically coupled individually to the plurality of drive terminals; a dummy terminal coupling wiring line electrically coupled to the dummy terminal; and a constant-potential wiring line which is electrically coupled to the constant-potential terminal, and to which the constant potential is applied, wherein the dummy terminal coupling wiring line and the constant-potential wiring line are electrically coupled to each other.

<5> The drive board according to <4>, further comprising a first wiring layer and a second wiring layer opposed to each other along a direction perpendicular to the board surface, wherein the drive device and the plurality of drive signal wiring lines are each arranged in the first wiring layer, and the constant-potential wiring line includes a first constant-potential wiring line arranged in the first wiring layer, and a second constant-potential wiring line which is arranged in the second wiring layer, and which is electrically coupled to the first constant-potential wiring line via a first through hole.

<6> The drive board according to <5>, further comprising a return wiring line which is arranged in the second wiring layer, and which is electrically coupled to a common electrode in the liquid jet head, wherein the return wiring line is electrically coupled to the second constant-potential wiring line, and electrically coupled to the dummy terminal coupling wiring line via a second through hole.

<7> The drive board according to <5> or <6>, wherein the second constant-potential wiring line includes a plurality of types of wiring lines to which the constant potentials different from each other are respectively applied, and the plurality of types of wiring lines is different in wiring line width from each other.

<8> The drive board according to <7>, wherein the plurality of types of wiring lines includes a ground wiring line to which a ground potential as the constant-potential is applied, and the wiring line width of the ground wiring line is largest of the wiring line widths of the plurality of types of wiring lines.

<9> The drive board according to any one of <5> to <8>, wherein the plurality of drive devices is cascaded to each other via the first constant-potential wiring line in the first wiring layer, and the second constant-potential wiring line is arranged in an area corresponding to an interval between the plurality of the drive devices in the second wiring layer.

<10> The drive board according to any one of <5> or <9>, wherein a circuit component is mounted on the second constant-potential wiring line.

<11> A liquid jet head comprising the drive board according to any one of <3> to <10>; and a jet section which is configured to jet the liquid based on the drive signal output from the drive board, and which has the plurality of nozzles.

<12> A liquid jet recording device comprising the liquid jet head according to <11>.

What is claimed is:

1. A drive board comprising at least one drive device configured to generate a drive signal to be applied to a liquid jet head having a plurality of nozzles, the drive device comprising:

a plurality of drive terminals which is arranged along a longitudinal direction of the drive device, and which is configured to individually output the drive signal for jetting liquid from the nozzles; and at least one dummy terminal configured to electrically be coupled to a predetermined constant potential, wherein the plurality of drive terminals is divided into a plurality of drive terminal groups arranged along the longitudinal direction, and the dummy terminal is arranged at at least one of intervals between the plurality of drive terminal groups, wherein the drive device is mounted on a board surface in the drive device, wherein the drive device has a constant-potential terminal, and the drive board further comprises:

a plurality of drive signal wiring lines electrically coupled individually to the plurality of drive terminals, a dummy terminal coupling wiring line electrically coupled to the dummy terminal; and a constant-potential wiring line which is electrically coupled to the constant-potential terminal, and to which the constant potential is applied, wherein the dummy terminal coupling wiring line and the constant-potential wiring line are electrically coupled to each other, and further wherein the drive board further comprises:

a first wiring layer and a second wiring layer opposed to each other along a direction perpendicular to the board surface, wherein the drive device and the plurality of drive signal wiring lines are each arranged in the first wiring layer, and the constant-potential wiring line includes a first constant-potential wiring line arranged in the first wiring layer, and a second constant-potential wiring line which is arranged in the second wiring layer, and which is electrically coupled to the first constant-potential wiring line via a first through hole.

2. The drive board according to claim 1, further comprising a return wiring line which is arranged in the second wiring layer, and which is electrically coupled to a common electrode in the liquid jet head, wherein the return wiring line is electrically coupled to the second constant-potential wiring line, and electrically coupled to the dummy terminal coupling wiring line via a second through hole.

3. The drive board according to claim 1, wherein the second constant-potential wiring line includes a plurality of types of wiring lines to which the constant potentials different from each other are respectively applied, and the plurality of types of wiring lines is different in wiring line width from each other.

4. The drive board according to claim 3, wherein the plurality of types of wiring lines includes a ground wiring line to which a ground potential as the constant-potential is applied, and the wiring line width of the ground wiring line is largest of the wiring line widths of the plurality of types of wiring lines.

5. The drive board according to claim 1, wherein the plurality of drive devices is cascaded to each other via the first constant-potential wiring line in the first wiring layer, and the second constant-potential wiring line is arranged in an area corresponding to an interval between a plurality of the drive devices in the second wiring layer.

6. The drive board according to claim 1, wherein a circuit component is mounted on the second constant-potential wiring line.

7. A liquid jet head comprising:

the drive board according to claim 1; and a jet section which is configured to jet the liquid based on the drive signal output from the drive board, and which has the plurality of nozzles.

8. A liquid jet recording device comprising the liquid jet head according to claim 7.

* * * * *